(12) United States Patent
Carnevali

(10) Patent No.: US 8,061,516 B2
(45) Date of Patent: *Nov. 22, 2011

(54) PORTABLE DEVICE HOLDER

(76) Inventor: Jeffrey D. Carnevali, Seattle, WA (US)

(\*) Notice: Subject to any disclaimer, the term of this patent is extended or adjusted under 35 U.S.C. 154(b) by 286 days.

This patent is subject to a terminal disclaimer.

(21) Appl. No.: 11/893,438

(22) Filed: Aug. 16, 2007

(65) Prior Publication Data

US 2009/0045087 A1    Feb. 19, 2009

(51) Int. Cl.
*B65D 85/00* (2006.01)

(52) U.S. Cl. ............. 206/320; 206/305; 24/3.7; 24/488; 379/446; 379/447; 379/454; 379/449

(58) Field of Classification Search .................. 206/320, 206/305, 316.1, 722, 586, 591, 592; 224/666, 224/667, 668; 379/441–457; 24/3.7, 488
See application file for complete search history.

(56) References Cited

U.S. PATENT DOCUMENTS

| | | | | |
|---|---|---|---|---|
| 4,845,738 A | * | 7/1989 | Takano | 455/569.2 |
| 5,480,115 A | * | 1/1996 | Haltof | 248/221.11 |
| 5,659,612 A | * | 8/1997 | Wang | 379/446 |
| 5,697,538 A | | 12/1997 | Goldenberg et al. | |
| 5,940,502 A | * | 8/1999 | Hirai et al. | 379/446 |
| 5,964,601 A | | 10/1999 | Tsurumaru et al. | |
| 6,141,417 A | * | 10/2000 | Lopez et al. | 379/446 |
| 6,176,401 B1 | * | 1/2001 | Lim | 224/196 |
| 6,370,037 B1 | | 4/2002 | Schoenfish | |
| 6,435,690 B1 | | 8/2002 | Till | |
| 6,529,381 B1 | | 3/2003 | Schoenfish | |
| 6,561,702 B1 | | 5/2003 | Yik | |
| 6,955,280 B2 | | 10/2005 | Saitoh et al. | |
| 2002/0009195 A1 | * | 1/2002 | Schon | 379/454 |
| 2002/0100782 A1 | | 8/2002 | Marvin | |

\* cited by examiner

*Primary Examiner* — Mickey Yu
*Assistant Examiner* — Chun Cheung
(74) *Attorney, Agent, or Firm* — Charles J. Rupnick Attorney at Law

(57) ABSTRACT

A quick release device holder for portable electronics devices that protects soft and impressionable housing materials from damage during insertion and removal. The quick release device holder includes a backing plane formed with a substantially rigid spine portion and a receiver pocket adjacent to a first end thereof. One or more latching arms extend from the backing plane spaced away from the receiver pocket, each of the one or more latching arms further including a resiliently flexible stem portion coupled to the backing plane and having a head portion spaced away from the backing plane. The head portion further includes one or more rollers coupled thereto in a position spaced away from an interior surface of the backing plane, and a retention tongue between the one or more rollers and the interior surface of the backing plane and being set back from a circumference of the one or more rollers.

30 Claims, 12 Drawing Sheets

PORTABLE DEVICE HOLDER

FIELD OF THE INVENTION

The present invention relates generally portable device holders, and in particular to quick release holders for portable cellular telephones and other portable electronics devices having external housings formed at least partially of an impressionable elastomer.

BACKGROUND OF THE INVENTION

Holders for portable device and in particular quick release holders for portable cellular telephones and other portable electronics devices are generally well-known. However, many modern portable electronics devices include external housings formed at least partially of a soft and impressionable elastomer materials for absorbing shocks and vibrations experienced in rugged outdoor sports and industrial environments and even in everyday use.

Many known portable device holders are incapable of receiving and subsequently releasing portable electronics devices without scaring or other damage to the soft and impressionable materials used in forming all or at least part of their external cases.

SUMMARY OF THE INVENTION

The present invention is a novel quick release device holder for portable electronics devices that overcomes limitations of prior device holders for protecting soft and impressionable elastomer housing materials from damage during insertion and removal.

According to one aspect of the novel quick release device holder includes a backing plane formed with a substantially rigid spine portion and a receiver pocket adjacent to a first end thereof One or more latching arms extend from the backing plane spaced away from the receiver pocket, each of the one or more latching arms further including a resiliently flexible stem portion coupled to the backing plane and having a head portion spaced away from the backing plane. The head portion further includes one or more rollers coupled thereto in a position spaced away from an interior surface of the backing plane, and a retention tongue between the one or more rollers and the interior surface of the backing plane and being set back from a circumference of the one or more rollers.

According to another aspect of the novel quick release device holder, the one or more latching arms that extend from the backing plane are further extended from the spine portion of the backing plane.

According to another aspect of the novel quick release device holder, the one or more rollers coupled to the head portion of each of the latching arms further includes a rotational axis thereof that is substantially crosswise to a direction substantially normal to the interior surface of the backing plane.

According to another aspect of the novel quick release device holder, the one or more latching arms further includes a pair of the latching arms, each of the pair of latching arms being extended from the backing plane adjacent to opposite sides thereof.

According to another aspect of the novel quick release device holder, the resiliently flexible stem portion of each of the pair of the latching arms is further formed as a torsional spring.

According to another aspect of the novel quick release device holder, the rotational axis of the one or more rollers coupled to the head portion is further oriented substantially parallel with the spine portion of the backing plane.

According to another aspect of the novel quick release device holder, the one or more latching arms further includes one or more of the latching arms that is extended from the spine portion of the backing plane adjacent to an end thereof opposite from the receiver pocket.

According to another aspect of the novel quick release device holder, the one or more latching arms further includes one or more of the latching arms substantially aligned with the spine portion of the backing plane.

According to another aspect of the novel quick release device holder, a method is disclosed for using the novel quick release device holder for holding a portable device, the method including at least partially inserting a base portion of a portable device into a receiver pocket formed adjacent to a base portion of a backing plane; moving an upper portion of the device opposite from the base portion thereof toward a spine portion of the backing plane adjacent to the receiver pocket; flexing one or more rollers outwardly of a spine portion of the backing plane; flexing one or more retention tongues outwardly of a spine portion of the backing plane; seating the device substantially against the spine portion of the backing plane; and forming at least one retention notch around a portion of the device by flexing at least one of the one or more retention tongues inwardly of a spine portion of the backing plane.

According to another aspect of the method for using the novel quick release device holder, the seating the device substantially against the spine portion of the backing plane further includes rolling the device past the one or more retention tongues on a circumferential portion of one of the one or more rollers.

According to another aspect of the method for using the novel quick release device holder, the forming at least one retention notch around a portion of the device by flexing at least one of the one or more retention tongues inwardly of a spine portion of the backing plane further includes positioning the at least one of the one or more retention tongues spaced away from a portion of the spine portion of the backing plane having the device substantially seated thereagainst.

According to another aspect of the method for using the novel quick release device holder, the flexing one or more rollers outwardly of a spine portion of the backing plane further includes seating a portion of the device against the roller, and pressing the device thereagainst.

According to another aspect of the method for using the novel quick release device holder, the flexing one or more rollers outwardly of a spine portion of the backing plane further includes flexing a resiliently flexible latching arm coupling one of the one or more rollers to the backing plane.

According to another aspect of the method for using the novel quick release device holder, the forming at least one retention notch around a portion of the device further includes relaxing the resiliently flexible latching arm coupling one of the one or more rollers to the backing plane.

According to another aspect of the method for using the novel quick release device holder, the flexing one or more rollers outwardly of a spine portion of the backing plane further includes the flexing one or more retention tongues outwardly of a spine portion of the backing plane.

According to another aspect of the method for using the novel quick release device holder, the flexing one or more rollers and one or more retention tongues outwardly of a spine portion of the backing plane further includes flexing an opposing pair of rollers and an opposing pair of retention tongues outwardly of opposing side portions of the spine portion of the backing plane; and the forming at least one retention notch around a portion of the device further comprises forming an opposing pair of retention notches around opposing portions of the device.

According to another aspect of the method for using the novel quick release device holder, the forming at least one retention notch around a portion of the device further includes spacing the one or more rollers farther than a corresponding one of the one or more retention tongues away from the spine portion of the backing plane.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
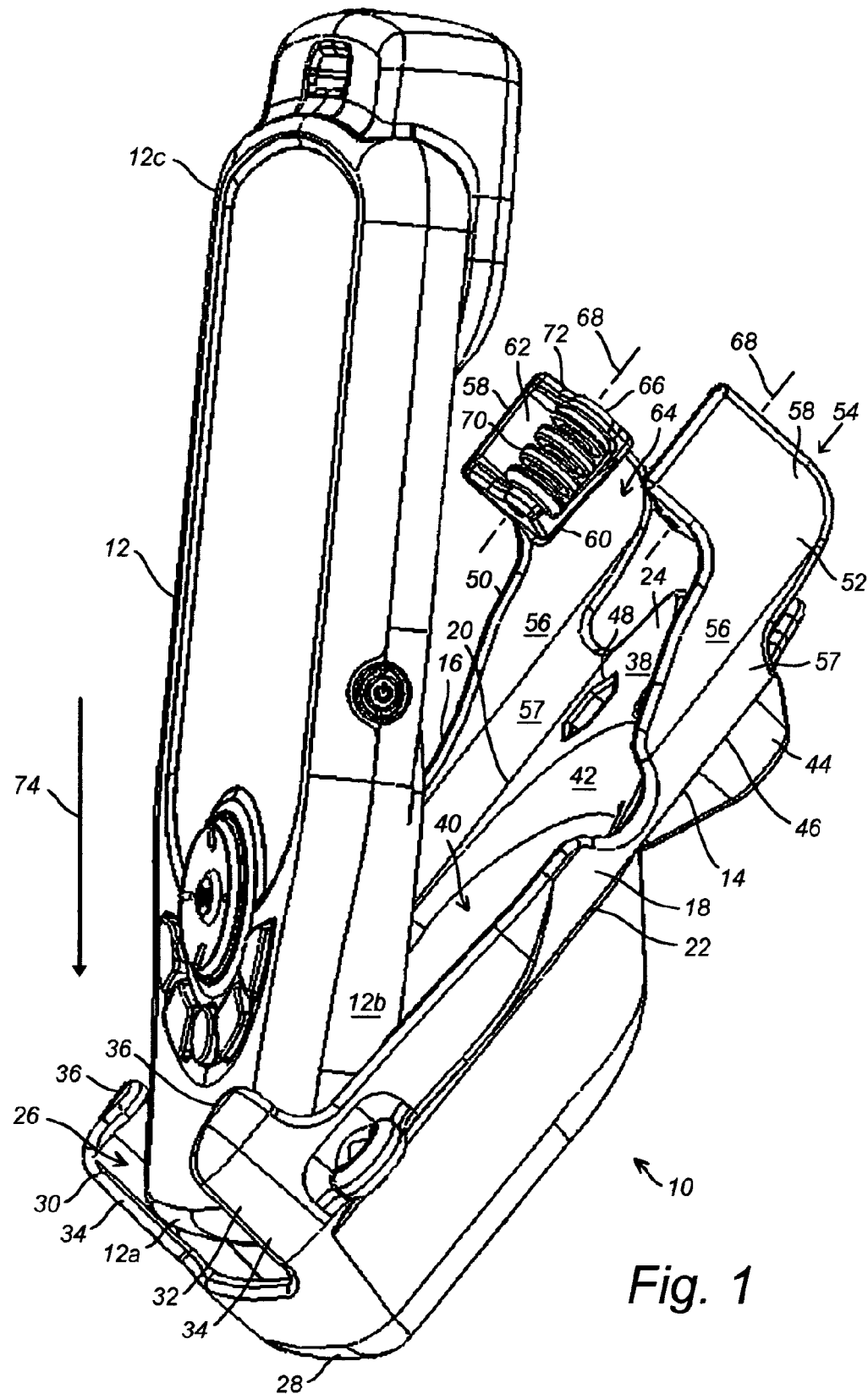
FIG. 1 is a perspective view that illustrates by example and without limitation a novel quick release portable device holder and partial operation thereof in combination with an appropriate device.

FIG. 1 illustrates by example and without limitation a novel quick release portable device holder, indicated generally at 10, in combination with a portable cellular telephone or another portable electronic device 12 illustrated here by example and without limitation as a ONIX400CR GPS (global positioning system) receiver available from Bushnell Corporation® of Overland Park, Kans. As such, the quick release portable device holder 10 is illustrated as being structured for receiving the device 12. Here, by example and without limitation, the device holder 10 is formed of a substantially rigid material, such as an injection moldable plastic having a backing plane 14 with opposing substantially rigid side walls 16, 18 formed adjacent to opposite sides 20, 22 of a substantially rigid spine portion 24 thereof and spaced appropriately to receive the device 12 snuggly therebetween.

The device holder 10 includes a receiver pocket 26 formed adjacent to a base portion 28 of the backing plane 14 and substantially aligned with the spine portion 24 thereof. Optionally, the receiver pocket 26 is structured to expose a base portion 12a of the device 12, for example when the base portion 12a includes electrical input/output connectors, such as a power connector for recharging the battery and/or a data entry and retrieval port. Accordingly, by example and without limitation, the receiver pocket 26 includes a pair of substantially rigid spaced apart symmetrically opposing receiver arms 30, 32 one each extending from the opposing side walls 16, 18 of the backing plane 14. Each of the opposing arms 30, 32 of the receiver pocket 26 is formed by a stem 34 generally extending away from the backing plane 14 and substantially terminating in a short flange 36 extending inwardly of the backing plane 14 and spaced away from a substantially smooth and generally planar interior device interface or "resting" surface 38 thereof sufficiently to receive the base portion 12a of the device 12. Here, by example and without limitation, the receiver pocket 26 also includes an optional open cavity 40 depressed into the backing plane 14 to accommodate a backwardly protruding portion 12b adjacent to the base portion 12a of the device 12.

The interior spine portion 24 of the backing plane 14 together with the opposing side walls 16, 18 and the receiver pocket 26 partially encloses an interior volume 42 of the device holder 10. A mounting interface structure 44 formed on an outside backing surface 46 of the backing plane 14 is structured for mounting either directly or indirectly on an external surface. By example and without limitation, the mounting interface structure 44 includes a pair holes 48 structured to receive a fastener therethrough.

The novel quick release device holder 10 is further formed with a pair of symmetrically opposing resiliently expandable latching or "spring" arms 50, 52 spaced apart on opposite sides 20, 22 of the backing plane 14. The spring arms 50, 52 extend along the respective opposing side walls 16, 18 of the backing plane 14 in positions adjacent to a second entrance end 54 of the device holder 10 spaced apart from the receiver pocket 26, the entrance end 54 of the device holder 10 being illustrated here by example and without limitation as being generally open for receiving the device 12 thereinto.

Each of the spaced apart spring arms 50, 52 is formed by example and without limitation as having a resiliently flexible stem portion 56 projected from the spine 24 of the backing plane 14 in a curved root portion 57 and extending along the respective side wall 16, 18 away from the receiver pocket 26. Each of the spring arms 50, 52 is illustrated as terminating in head portion 58 spaced away from the spine 24 of the backing plane 14. Each head portion 58 is formed with a device retention tongue 60 extended from an interior surface 62 thereof Each retention tongue 60 extends inwardly of the backing plane 14 and generally toward the opposing one of the arms 50 (or 52). Each retention tongue 60 generally faces toward the device resting surface 38 interior of the backing plane 14 and is spaced away therefrom. A device retention notch 64 is formed between the retention tongue 60 of each spring arm 50, 52 and the interior device resting surface 38 of the backing plane 14 between the opposing side walls 16, 18 thereof. Thus, one of the retention notches 64 is formed on opposite sides of the device holder 10 adjacent to each of the opposing side walls 16, 18 between the retention tongue 60 of each spring arm 50, 52 and the interior device resting surface 38 of the backing plane 14, which is more clearly shown in subsequent Figures.

Additionally, each of the spring arms 50, 52 also includes a small roller 66 rotatably coupled to the head portion 58 of each of the spring arm stems 56 with each of the rollers 66 being oriented such that it is rotatable about an axis 68 substantially aligned with a corresponding one of the stems 56. The rollers 66 are each spaced farther from the backing plane 14 than the corresponding retention tongue 60. Furthermore, each of the rollers 66 has a circumference 70 that is sufficiently large relative to the head portion 58 as to be extended inwardly of the backing plane 14 into the interior volume 42 of the device holder 10 toward the opposing one of the arms 50 (or 52) farther than the corresponding retention tongue 60. Accordingly, as more clearly illustrated in subsequent Figures, the retention tongue 60 includes a set-back 71 from the circumference 70 of the rollers 66 large enough for the retention tongue 60 to remain spaced away from contact with the device 12 during both insertion and subsequent removal.

Optionally, as illustrated here, the rollers 66 are suspended from the corresponding head portion 58 on a pair of support flanges 72 extended from the interior surface 62 thereof. Each pair of support flanges 72 is structured to rotatably couple the corresponding roller 66 therebetween. The circumference 70 of each roller 66 is sufficiently large relative to the support flanges 72 as to be extended inwardly of the backing plane 14 into the interior volume 42 of the device holder 10 toward the opposing one of the arms 50 (or 52) farther than the corresponding support flanges 72, as more clearly illustrated in subsequent Figures.

As illustrated, the head 58 is optionally formed with the retention tongue 60 integral with the flanges 72 supporting the rollers 66.

As illustrated here, the device 12 is being either inserted into or removed from the novel quick release portable device holder 10. Accordingly, as generally indicated by arrow 74, the base portion 12a of the device 12 is received into the receiver pocket 26 between the inwardly extending flanges 36 adjacent to the ends of the stems 34 of the receiver arms 30, 32 and the interior device resting surface 38 of the backing plane 14, while the backwardly protruding portion 12b of the device 12 is received into the cavity 40. At this stage, a head portion 12c of the device 12 is outside the device holder 10.

Figure 2:
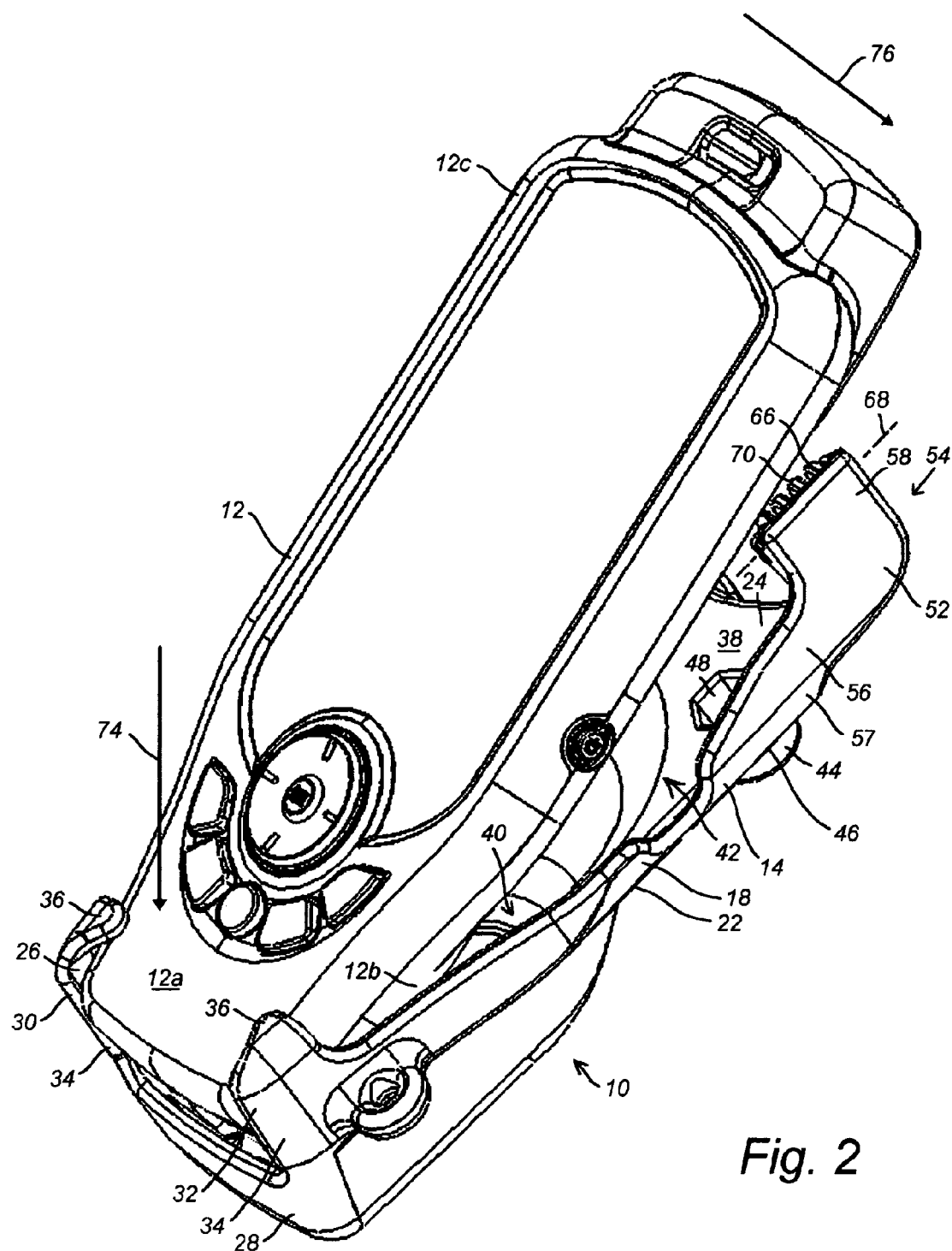
FIG. 2 is another perspective view that illustrates by example and without limitation a novel quick release portable device holder and partial operation thereof in combination with an appropriate device.

FIG. 2 illustrates the device 12 is being either inserted farther into or less removed from the novel quick release portable device holder 10. Accordingly, as generally indicated by arrow 76, the head portion 12c of the device 12 is rotated in a direction substantially normal to the interior device resting surface 38 of the backing plane 14 about the base portion 12a relative to the receiver pocket 26. Initially, the device 12 is rotated until opposing shoulder portions 12d of the device 12 on opposite sides of the head portion 12c contact the rollers 66 on the respective head portions 58 of the spring arm stems 56. At this stage, the head portion 12c of the device 12 is outside the device holder 10.

Figure 3:
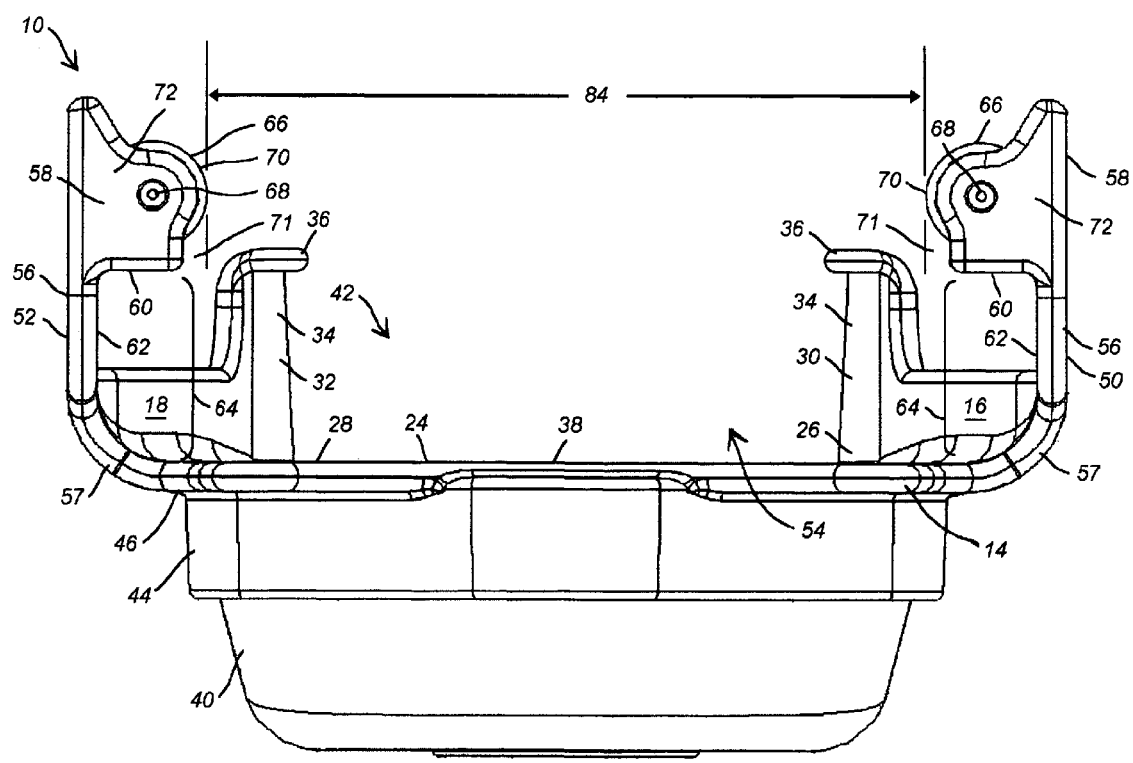
FIG. 3 illustrates the novel quick release portable device holder as seen from one end.

FIG. 3 illustrates the novel quick release portable device holder 10 as seen from the entrance end 54 opposite from the receiver pocket 26. The device holder 10 is shown here without the device 12. As illustrated here, the stems 56 of the spring arms 50, 52 extend out of both the respective side wall 16, 18 and the opposite sides 20, 22 of spine 24 of the backing plane 14. As illustrated here and discussed herein, each of the spring arms 50, 52 terminates in head portion 58, which includes support flanges 72 extended from the interior surface 62 thereof and spaced away from the spine 24 of the backing plane 14. As illustrated here, the retention tongues 60 are formed integrally with the flanges 72 on interior surfaces thereof substantially facing toward the device resting surface 38 interior of the backing plane 14 and spaced away therefrom. The retention notches 64 are formed between the inwardly facing retention tongues 60 and the device resting surface 38 interior of the backing plane 14. One of the retention notches 64 is thus formed on each side of the device holder 10 adjacent to each of the opposing side walls 16, 18 between the retention tongue 60 of each spring arm 50, 52 and the interior device resting surface 38 of the backing plane 14.

Figure 4:
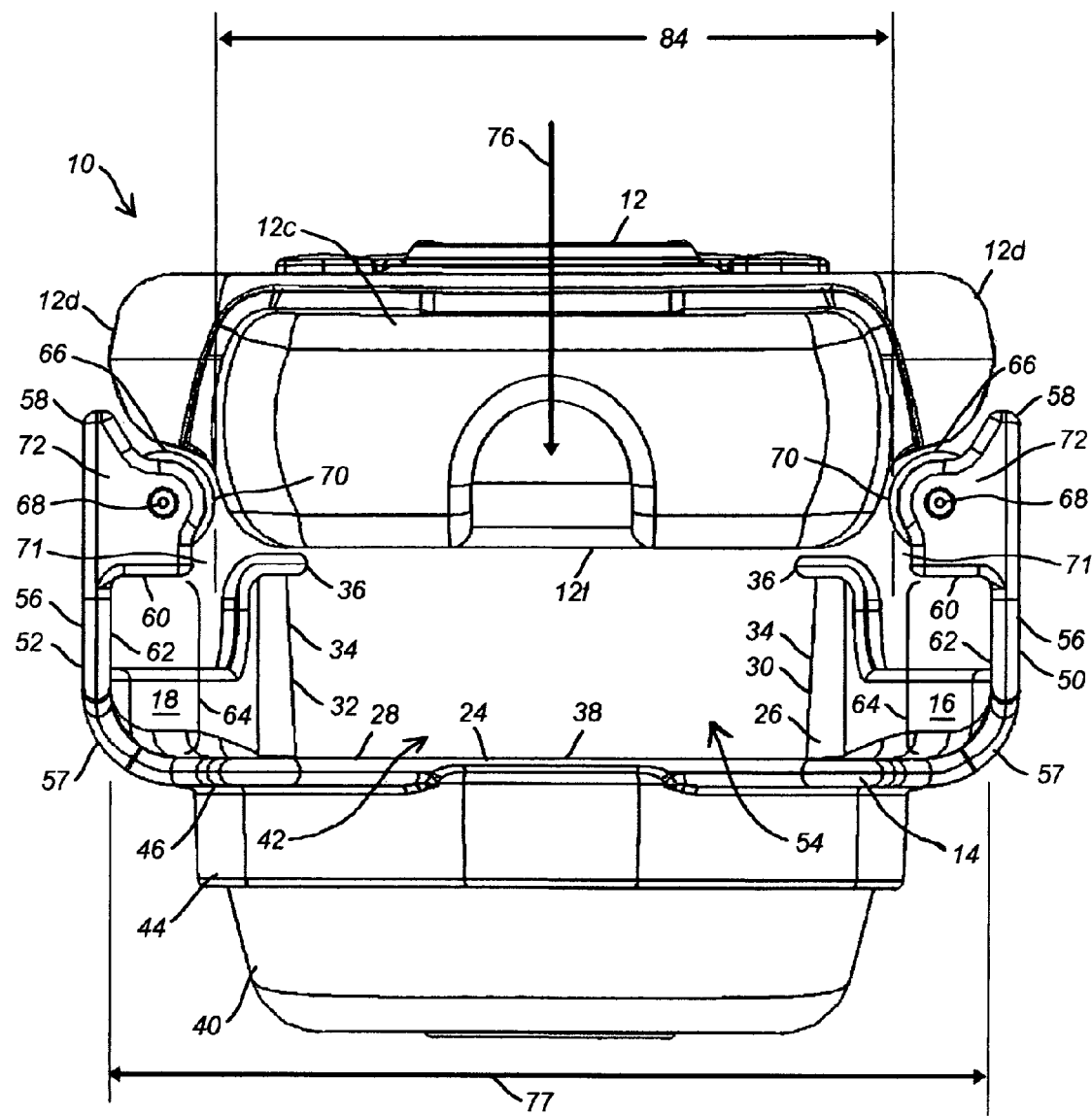
FIG. 4 illustrates the device immediately outside the novel device holder.

FIG. 4 illustrates the head portion 12c of the device 12 immediately outside the device holder 10. As illustrated, the device holder 10 is sized with the interior surfaces 62 of the opposing head portions 58 being spaced apart by a distance 77 slightly wider than the opposing shoulder portions 12d to receive the device 12 snuggly therebetween. The retention tongues 60 are set sufficiently far from the device resting surface 38 interior of the backing plane 14 to permit the shoulder portions 12d of the device 12 to be received into the retention notches 64. The rollers 66 are positioned on the respective head portions 58 to engage the device's shoulder portions 12d before engagement thereof by the supporting flanges 72. As discussed herein, the axes 68 of the rollers 66 are substantially aligned with a corresponding one of the stems 56. Furthermore, the axes 68 of the rollers 66 are further oriented substantially crosswise of the rotational direction of the head portion 12c of the device 12 during insertion and removal, that is substantially normal to the interior device resting surface 38 of the backing plane 14, as generally indicated by arrow 76.

Figure 5:
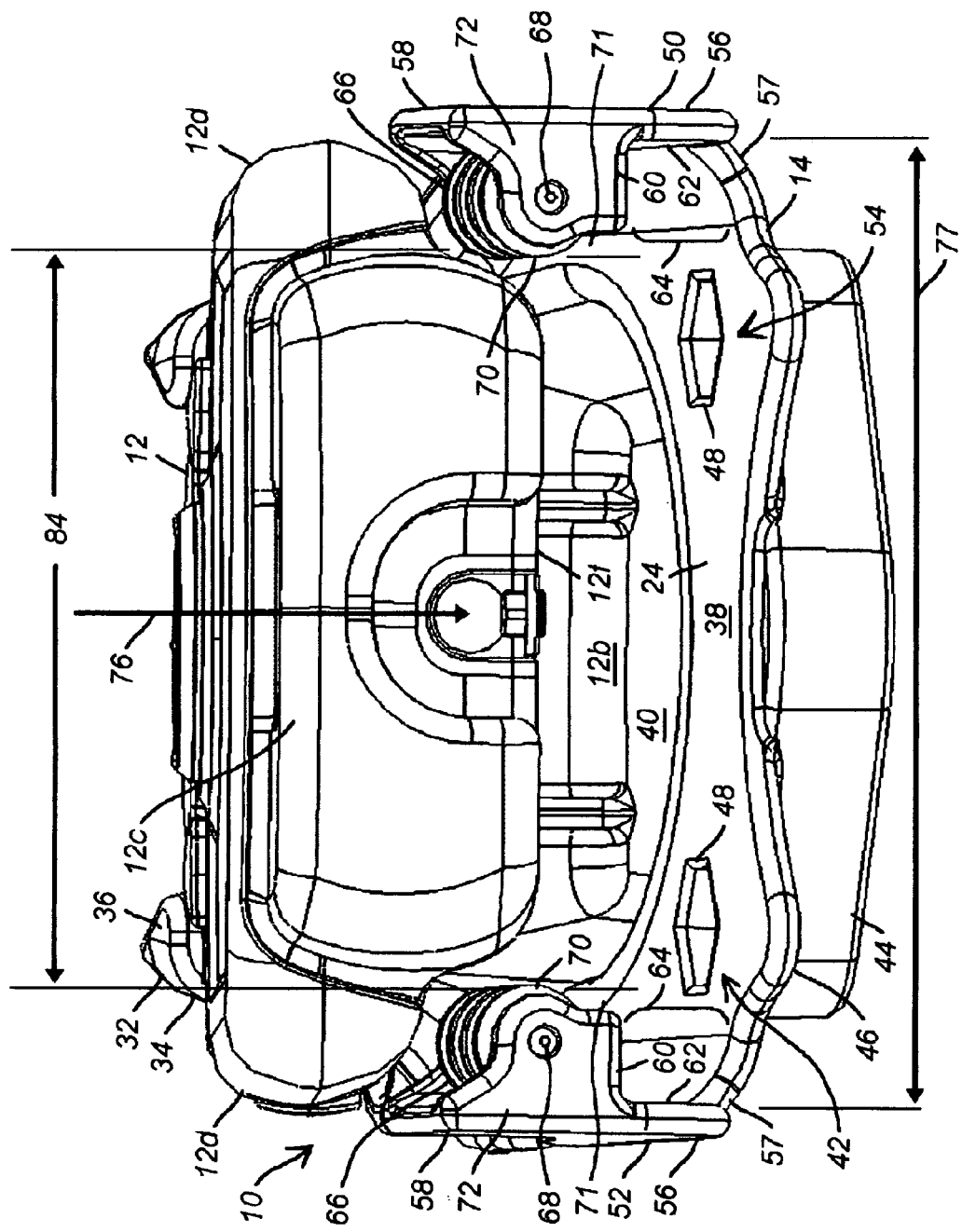
FIG. 5 is a perspective view illustrating the entire device immediately outside the novel device holder.

FIG. 5 is a perspective view illustrating the entire device 12 immediately outside the device holder 10, similarly to FIG. 4.

Figure 6:
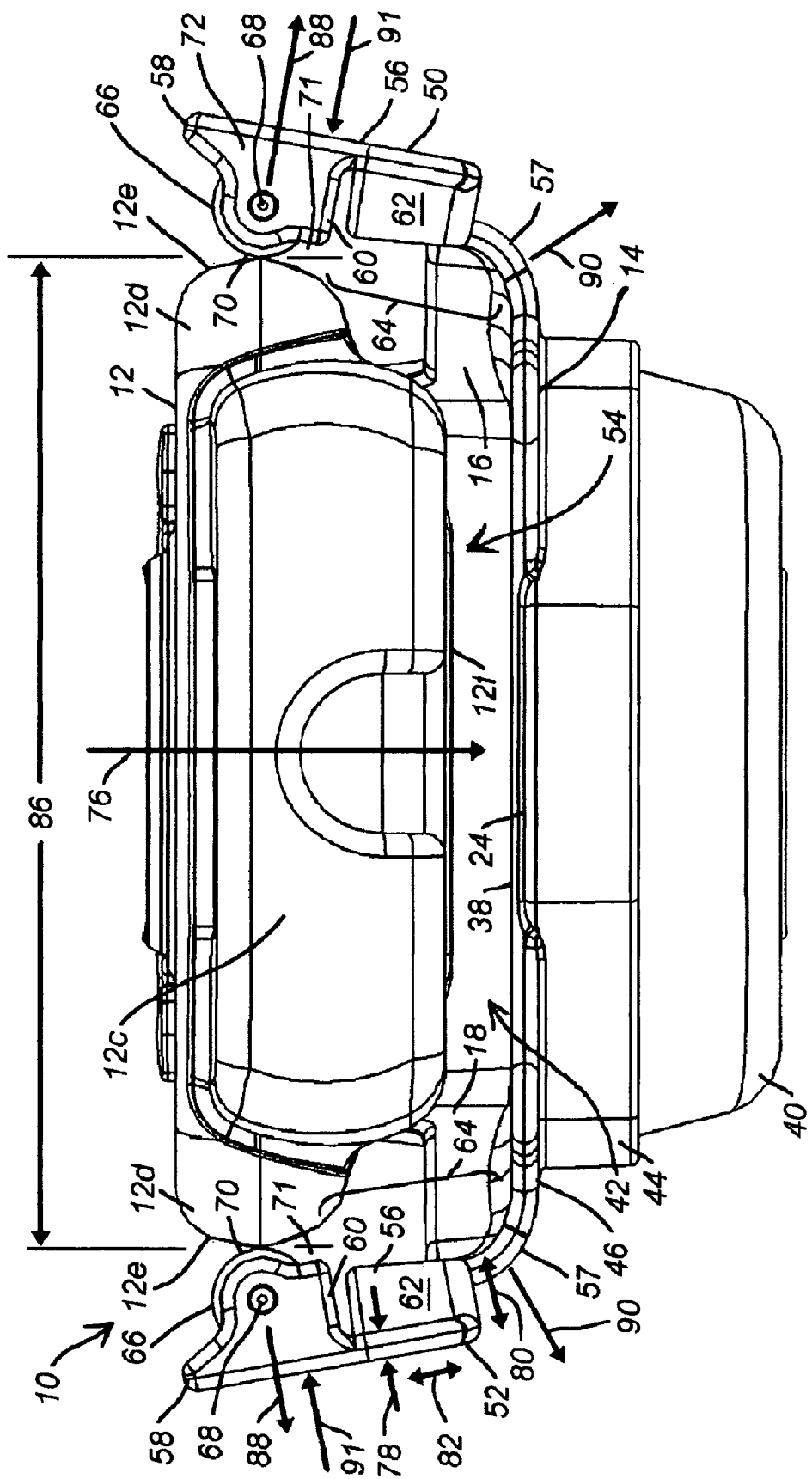
FIG. 6 illustrates an intermediate step in the process of inserting the device into the novel device holder, or subsequently removal therefrom.

FIG. 6 illustrates an intermediate step in the process of inserting the device 12 into the device holder 10, or subsequently removing it therefrom. The device holder 10 is formed of a substantially rigid material, such as an injection moldable plastic. However, in thin sections the substantially rigid material is resiliently flexible. Accordingly, a thickness 78 is selected for the pair of symmetrically opposing resiliently flexible latching or "spring" arms 50, 52 relative to other parameters, including for example a length dimension 80 and a width dimension 82 of the stem portions 56, as well as dimensions of the curved root portion 57 coupling the stem portions 56 to the spine 24 of the backing plane 14. Appropriate selection of these parameters determined using known mechanical design principles and tools in combination with material selection results in each spring arm 50, 52 being stiff but sufficiently resiliently flexible as to form torsion springs having the head portion 58 at its terminus. The spring arms 50, 52 are resiliently spreadable to increase an initial relaxed inter-roller spacing 84 between the rollers 66 (shown in FIG. 3) to an intermediate expanded inter-roller spacing 86 spread sufficiently wide to pass therebetween the opposing shoulder portions 12d of the device 12.

Here, the stem portion 56 of the spring arms 50, 52 is formed by example and without limitation having a thickness dimension 78 of about $\frac{1}{10}$ inch, a effective length dimension 80 of about 2 inches, and a width dimension 82 varying between about $\frac{1}{4}$ inch nearer the receiver pocket 26 and about $\frac{5}{8}$ inch nearer the head portion 58, when the device holder 10 is formed of a substantially rigid injection moldable plastic material.

As generally indicated by arrows 88, the stem portions 56 of the spring arms 50, 52 simultaneously flex outward of the spine 24 of the backing plane 14 to expanded inter-roller spacing 86 sufficiently wide for the shoulder portions 12*d* of the device 12 to pass between the opposing rollers 66, as generally indicated by arrow 76. Optionally, as generally indicated by arrows 90, the curved root portions 57 of the spring arms 50, 52 are also structured to flex outward of the spine 24 of the backing plane 14 simultaneously with the flexing stem portions 56, whereby the curved root portions 57 are also involved in expanding the relaxed inter-roller spacing 84 to the expanded inter-roller spacing 86 necessary for passing the shoulder portions 12*d* of the device 12 between the opposing rollers 66. Accordingly, involvement of the root portions 57 in spreading the spring arms 50, 52 is also contemplated and may be included as a matter of design choice without deviating from the scope and intent of the present invention.

As illustrated, during the insertion (and removal) process, only the rollers 66 contact the device shoulders 12*d*. As indicated by arrows 91, spring pressure of the expanded spring arms 50, 52 causes the rollers 66 to substantially continuously follow contours 12*e* of device shoulders 12*d*. The circumference 70 of the rollers 66 is sufficiently large relative to other components the head portion 58 generally and the device retention tongues 60 particularly such that contact with the device shoulders 12*d* is effectively restricted to only the rollers 66 during both the insertion and removal processes. The rollers 66 remain in contact with the device shoulders 12*d* until a back portion 12*f* of the device 12 is substantially seated against the device resting surface 38 interior of the backing plane 14 with the base portion 12*a* of the device 12 is seated in the receiver pocket 26, and if present the backwardly protruding portion 12*b* of the device 12 is received into the cavity 40. Thus, the rollers 66 protect the soft and impressionable elastomer materials of the device shoulders 12*d* from any contact with the unforgiving rigid material of the head portion 58 generally and the device retention tongues 60 particularly so that scratching and other potential damage to the device 12 is avoided. Rolling motion of the rollers 66 over the device shoulders 12*d* even ensures that even the surface finish of the soft and impressionable elastomer materials of the device 12 is protected even from scuffing. Accordingly, the rollers 66 are optionally either a soft rubbery material, such as neoprene, or a harder material, such as injection molded plastic. Either the soft rubbery material or the harder material can be used without damaging even the surface finish of the soft and impressionable elastomer materials of the device 12.

Incorporation of the roller 66 with the head portion 58 also results in the spring arms 50, 52 operating to retract the device 12 into the holder 10. During progress toward the retention notches 64, the shoulder portions 12*d* of the device 12 pass an equilibrium position relative to the rollers 66 when a maximum of the contours 12*e* of the shoulder portions 12*d* is aligned with the axes 68 of the rollers 66, as illustrated. At this point during insertion of the device 12, the spring pressure of the expanded spring arms 50, 52, as indicated by arrows 91, causes the arms 50, 52 to contract toward one another across the device 12. The contours 12*e* of device shoulders 12*d* becoming narrower permits the maximally expanded spring arms 50, 52 to press the device shoulders 12*d* toward the device resting surface 38 interior of the backing plane 14 by pressure of the contracting rollers 66, as indicated by arrow 76.

Figure 7:
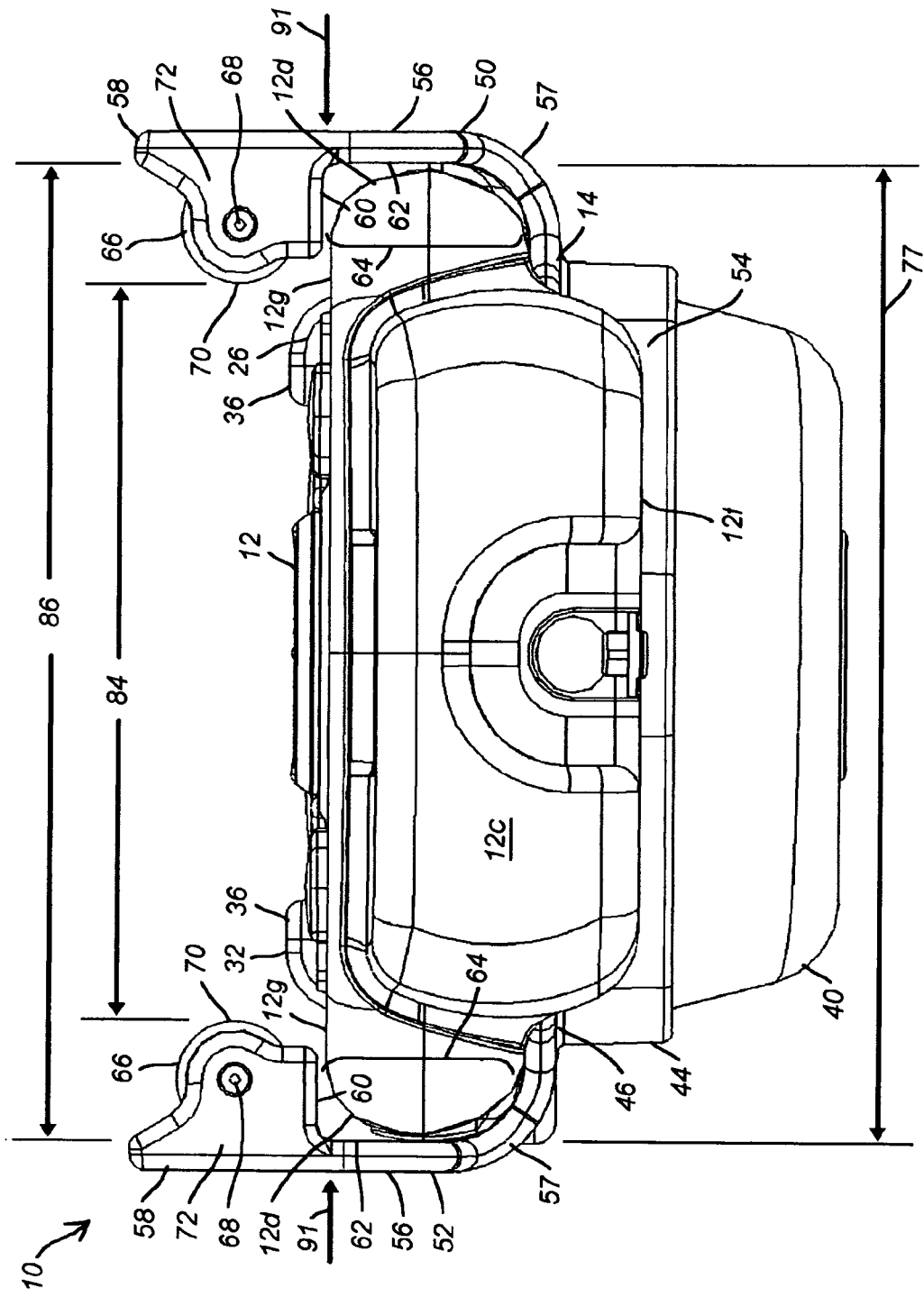
FIG. 7 illustrates a pair of spring arms of the novel device holder contracted from an expanded spacing for retaining the device therein.

FIG. 7 illustrates the spring arms 50, 52 contracted from the shoulder-width expanded inter-roller spacing 86 needed to receive the device 12 to the initial relaxed inter-roller spacing 84. The spring arms 50, 52 contract automatically due to spring pressure, as generally indicated by arrows 91. The spring arms 50, 52 operate by spring torque caused by twisting deflection of the stem portions 56 away the spine 24 and respective opposing side walls 16, 18 of the backing plane 14. Additional spring torque may be caused by the involvement of the root portions 57 in spreading the spring arms 50, 52 as a matter of design choice without deviating from the scope and intent of the present invention. Accordingly, once the device 12 is out from between the rollers 66, the head portions 58 snap back into their respective relaxed positions with their respective interior surfaces 62 adjacent to the device shoulders 12*d* and the inwardly facing retention tongues 60 adjacent to a face portion 12*g* of the device head portion 12*c*. The head portions 58 of the respective spring arms 50, 52 thus reform the retention notches 64 between the inwardly facing retention tongues 60 and the device resting surface 38 interior of the backing plane 14. Thereafter, the device shoulder portions 12*d* are captured within the retention notches 64, and the device 12 is effectively retained in the interior volume 42 of the device holder 10.

Figure 8:
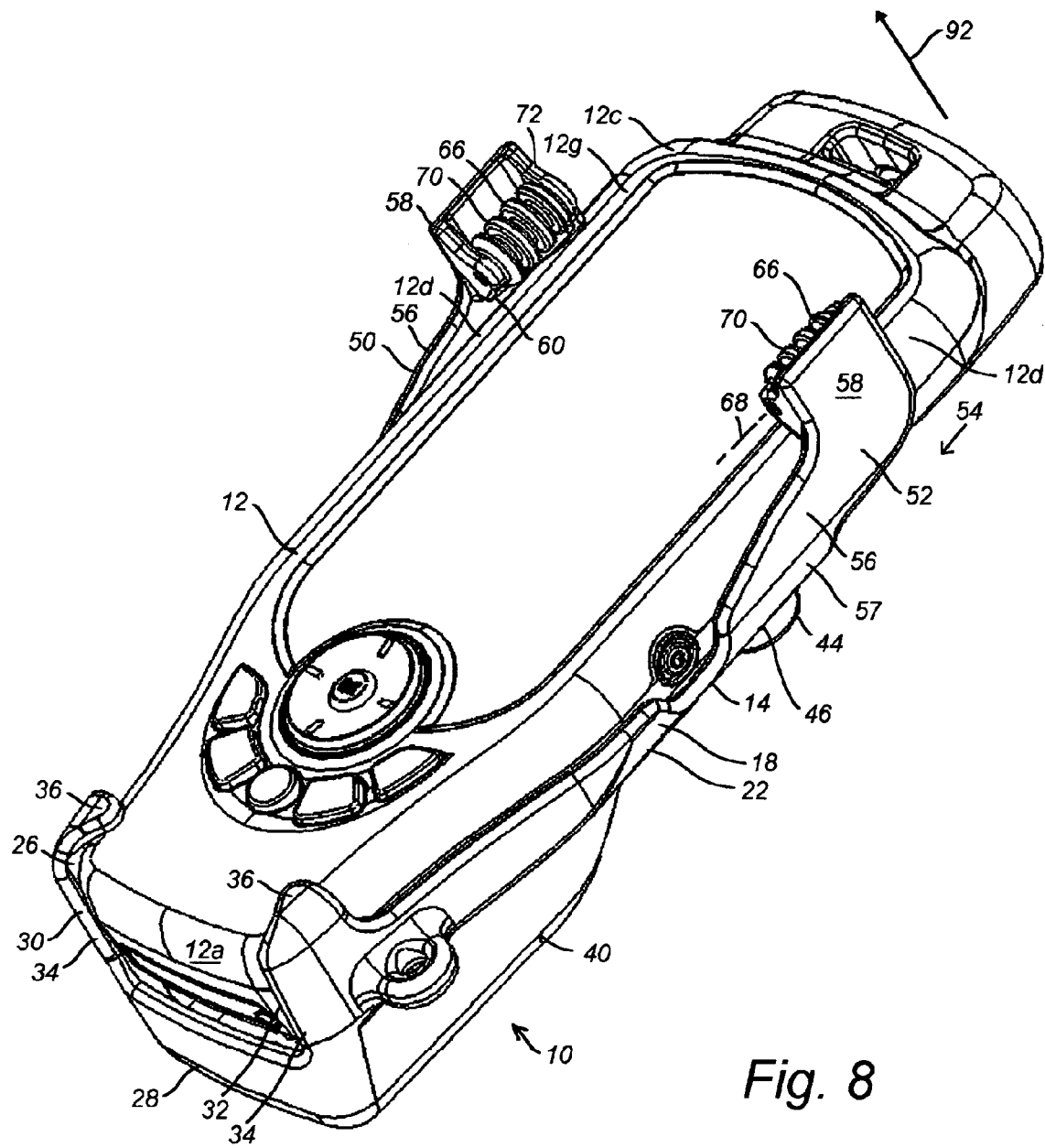
FIG. 8 also illustrates the spring arms of the novel device holder contracted from the expanded spacing for retaining the device therein.

FIG. 8 also illustrates the spring arms 50, 52 contracted from the shoulder-width expanded inter-roller spacing 86 needed to receive the device 12 to the initial relaxed inter-roller spacing 84. Accordingly, the base portion 12*a* of the device 12 is seated in the receiver pocket 26 with the backwardly protruding portion 12*b* of the device 12, if present, received into the cavity 40, while the device shoulder portions 12*d* are captured within the retention notches 64, and the device 12 is effectively retained in the interior volume 42 of the device holder 10.

The device 12 is subsequently removed from the novel quick release portable device holder 10 in reverse of the insertion described herein by simply forcing the head portion 12*c* away from the backing plane 14 in a direction substantially normal to the interior device resting surface 38, as generally indicated by arrow 92. Pressure of the shoulder portions 12*d* against the rollers 66 forces the heads 58 to flex outwardly away from the backing plane 14, whereupon the shoulder portions 12*d* are rolled through the resulting expanded inter-roller spacing 86.

Incorporation of the roller 66 with the head portion 58 also results in the spring arms 50, 52 operating to eject the device 12 from the holder 10. During removal from the retention notches 64, the maximum of the contours 12*e* of the shoulder portions 12*d* of the device 12 pass the equilibrium position relative to the rollers 66, as illustrated in FIG. 6. Thereafter, the spring pressure of the expanded spring arms 50, 52, as indicated by arrows 91, causes the arms 50, 52 to contract toward one another across the device 12. The contours 12*e* of device shoulders 12*d* becoming narrower permits the maximally expanded spring arms 50, 52 to push the device shoulders 12*d* away from the device resting surface 38 interior of the backing plane 14 by pressure of the contracting rollers 66, as indicated by arrow 92.

Thus, the quick release feature of the device holder 10 is accomplished by the slight pressure that expands the spring arms 50, 52 to release the device 12.

Figure 9:
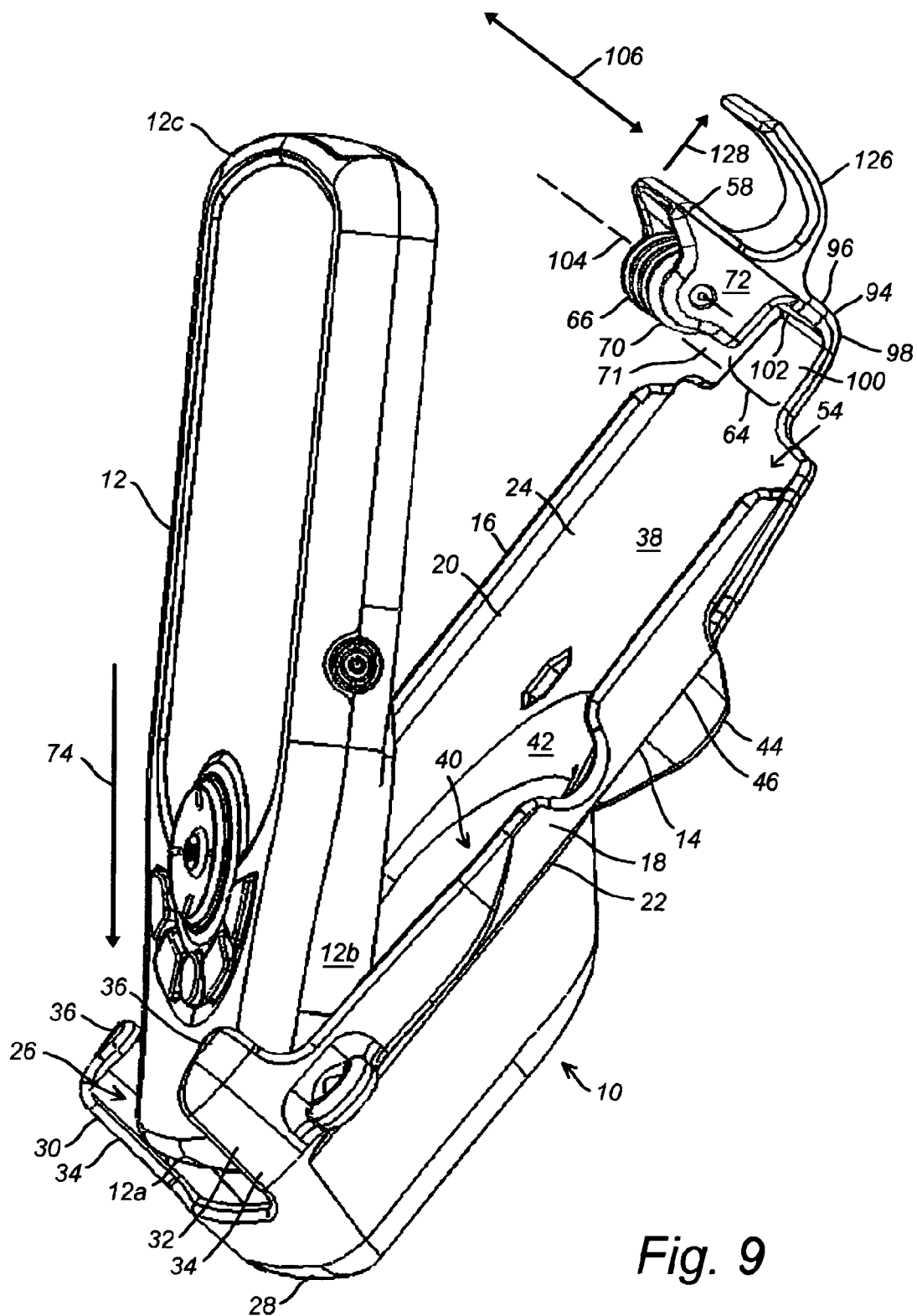
FIG. 9 illustrates one alternative embodiment of the novel quick release portable device holder.

FIG. 9 illustrates one alternative embodiment of the novel quick release portable device holder 10. Such alternative embodiments are also contemplated and may be substituted without deviating from the scope and intent of the present invention. Thus, as illustrated here by example and without limitation, the device holder 10 is formed with as little as a single resiliently expandable latching or "spring" arm 94 adjacent to the entrance end 54 and spaced apart from the receiver pocket 26. However, multiple spring arms 94 are also contemplated and may be substituted as a matter of design choice without deviating from the scope and intent of the present invention.

The one or more spring arms 94 is formed by example and without limitation as having a resiliently flexible stem portion 96 projected from the spine 24 of the backing plane 14 in a curved root portion 98 and extending substantially normal to the spine 24 away from the device resting surface 38 interior of the backing plane 14. Optionally, as illustrated here, the spring arm 94 also includes a resiliently flexible base portion 100 extended, for example, between the spine 24 of the backing plane 14 and the curved root portion 98. The resiliently flexible base portion 100 of the spring arm 94 is optionally formed as a neck-down portion of the backing plane spine 24, as illustrated, or another portion of the backing plane 14. The base portion 100 is extended adjacent to the entrance end 54 of the of the device holder 10 beyond the side walls 16, 18 of the backing plane 14. The base portion 100 thus avoids the stiffening influence of the side walls 16, 18 so that its flexibility is a function of its length, width and thickness dimensions in combination with the selected material and can be determined using known mechanical design principles and tools.

Each of the one or more spring arms 94 is illustrated as terminating in the head portion 58 spaced away from the spine 24 of the backing plane 14. As discussed herein, each head portion 58 is formed with the device retention tongue 60 extended from an interior surface 102 thereof. Each retention tongue 60 extends inwardly of the backing plane 14 and generally toward the opposing receiver pocket 26 thereof adjacent to the base portion 28 of the backing plane 14. Each retention tongue 60 generally faces toward the device resting surface 38 and is spaced away therefrom. The device retention notch 64 is formed between the retention tongue 60 and the device resting surface 38 interior of the backing plane 14 between the opposing side walls 16, 18 thereof. Thus, one of the retention notches 94 is formed adjacent to entrance end 54 of the device holder 10, which is more clearly shown in subsequent Figures.

Additionally, each of the one or more spring arms 94 also includes the small roller 66 rotatably coupled to the head portion 58 with each of the rollers 66 being oriented such that it is rotatable about an axis 104 substantially aligned with the receiver pocket 26 and the device resting surface 38 interior of the backing plane 14. The roller 66 is spaced farther from the backing plane 14 than the corresponding retention tongue 60. Furthermore, the circumference 70 of the roller 66 is sufficiently large relative to the head portion 58 as to be extended inwardly of the backing plane 14 into the interior volume 42 of the device holder 10 toward the opposing receiver pocket 26 farther than the corresponding retention tongue 60.

Optionally, as illustrated here, the roller 66 is suspended from the corresponding head portion 58 on the pair of support flanges 72 extended from the interior surface 102 thereof. The support flanges 72 are structured to rotatably couple the corresponding roller 66 therebetween. The circumference 70 of the roller 66 is sufficiently large relative to the support flanges 72 as to be extended inwardly of the backing plane 14 into the interior volume 42 of the device holder 10 toward the opposing receiver pocket 26 farther than the corresponding support flanges 72. Accordingly, as more clearly illustrated in subsequent Figures, the retention tongue 60 includes the set-back 71 from the circumference 70 of the rollers 66 large enough for the retention tongue 60 to remain spaced away from contact with the device 12 during both insertion and subsequent removal.

As illustrated, the head 58 is optionally formed with the retention tongue 60 integral with the flanges 72 supporting the roller 66.

As illustrated here and generally indicated by arrow 106, the device 12 is being either inserted into or removed from the novel quick release portable device holder 10 along a direction substantially normal to the interior device resting surface 38 of the backing plane 14. Accordingly, as generally indicated by arrow 74, the base portion 12a of the device 12 is received into the receiver pocket 26 between the inwardly extending flanges 36 adjacent to the ends of the stems 34 of the receiver arms 30, 32 and the device resting surface 38 interior of the backing plane 14, while the backwardly protruding portion 12b of the device 12 is received into the cavity 40. At this stage, a head portion 12c of the device 12 is outside the device holder 10.

As discussed herein, the head portion 12c of the device 12 is rotated about the base portion 12a relative to the receiver pocket 26 until opposing shoulder portions 12d of the device 12 on opposite sides of the head portion 12c contact the rollers 66 on the respective head portions 58 of the spring arm stems 56.

Figure 10:
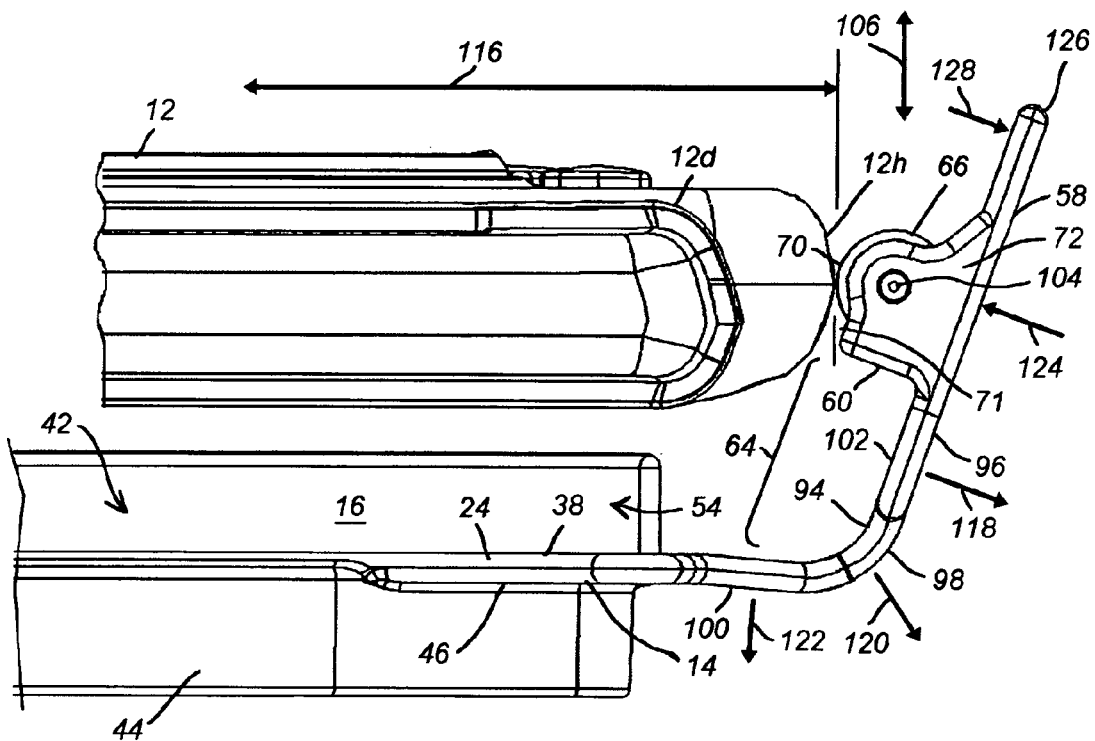
FIG. 10 illustrates an intermediate step in the process of inserting the device into the alternative novel device holder, or subsequently removal therefrom.

FIG. 10 illustrates the intermediate step in the process of inserting the device 12 into the alternative device holder 10, or subsequently removing it therefrom. The alternative device holder 10 is formed of a substantially rigid material, such as an injection moldable plastic, as discussed herein. However, as discussed herein, in thin sections the substantially rigid material is resiliently flexible. Accordingly, a thickness 108 is selected for the resiliently flexible latching or "spring" arm 94 relative to other parameters, including for example a length dimension 110 and a width dimension 112 (normal to page) of the stem portion 96, as well as dimensions of the curved root portion 98 and the resiliently flexible base portion 100, if present. Appropriate selection of these parameters determined using known mechanical design principles and tools in combination with material selection results in spring arm 94 being stiff but sufficiently resiliently flexible as to form torsion springs having the head portion 58 at its terminus. The spring arm 94 is resiliently spreadable to increase an initial relaxed roller-to-receiver pocket spacing 114 between the roller 66 and the opposing receiver pocket 26 (shown in FIG. 11) to an intermediate expanded roller-to-receiver pocket spacing 116 spread sufficiently wide to pass therebetween the head portion 12c of the device 12.

As generally indicated by arrow 118, the stem portion 94 of the spring arm 94 flexes outward of the spine 24 of the backing plane 14 to expanded roller-to-receiver pocket spacing 116 sufficiently wide for the shoulder portions 12d of the device 12 to pass the roller 66, as generally indicated by arrow 106. Optionally, as generally indicated by arrow 120, the curved root portions 98 of the spring arm 94 is also structured to flex outward of the spine 24 of the backing plane 14 simultaneously with the flexing stem portion 96, whereby the curved root portion 98 is also involved in expanding the relaxed roller-to-receiver pocket spacing 114 to the expanded roller-to-receiver pocket spacing 116 necessary for passing the head portion 12c of the device 12 between the receiver pocket 26 and opposing roller 66. Accordingly, involvement of the root portions 98 in spreading the spring arm 94 is also contemplated and may be included as a matter of design choice without deviating from the scope and intent of the present invention.

Additionally, as generally indicated by arrow 122, the necked-down base portion 100 of the spring arm 94 is also structured to flex outward of the spine 24 of the backing plane 14 simultaneously with the flexing stem and curved root portions 96 and 98, whereby the necked-down base portion 100 is also involved in expanding the relaxed roller-to-receiver pocket spacing 114 to the expanded roller-to-receiver pocket spacing 116 between the receiver pocket 26 and opposing roller 66. Accordingly, involvement of the necked-down base portion 100 in spreading the spring arm 94 is also contemplated and may be included as a matter of design choice without deviating from the scope and intent of the present invention.

As illustrated, during the insertion (and removal) process, only the roller 66 contacts the head portion 12c of the device 12. As indicated by arrow 124, spring pressure of the expanded spring arm 94 causes the roller 66 to substantially continuously follow contours 12h of device head portion 12c. The circumference 70 of the roller 66 is sufficiently large relative to other components the head portion 58 generally and the device retention tongues 60 particularly such that contact with the device head portion 12c is effectively restricted to only the rollers 66 during both the insertion and removal processes. The roller 66 remains in contact with the device head portion 12c until the back portion 12f of the device 12 is substantially seated against the device resting surface 38 interior of the backing plane 14 with the base portion 12a of the device 12 is seated in the receiver pocket 26, and if present the backwardly protruding portion 12b of the device 12 is received into the cavity 40. Thus, the roller 66 protects the soft and impressionable elastomer materials of the device head portion 12c from any contact with the unforgiving rigid material of the head portion 58 generally and the device retention tongues 60 particularly so that scratching and other potential damage to the device 12 is avoided.

Figure 11:
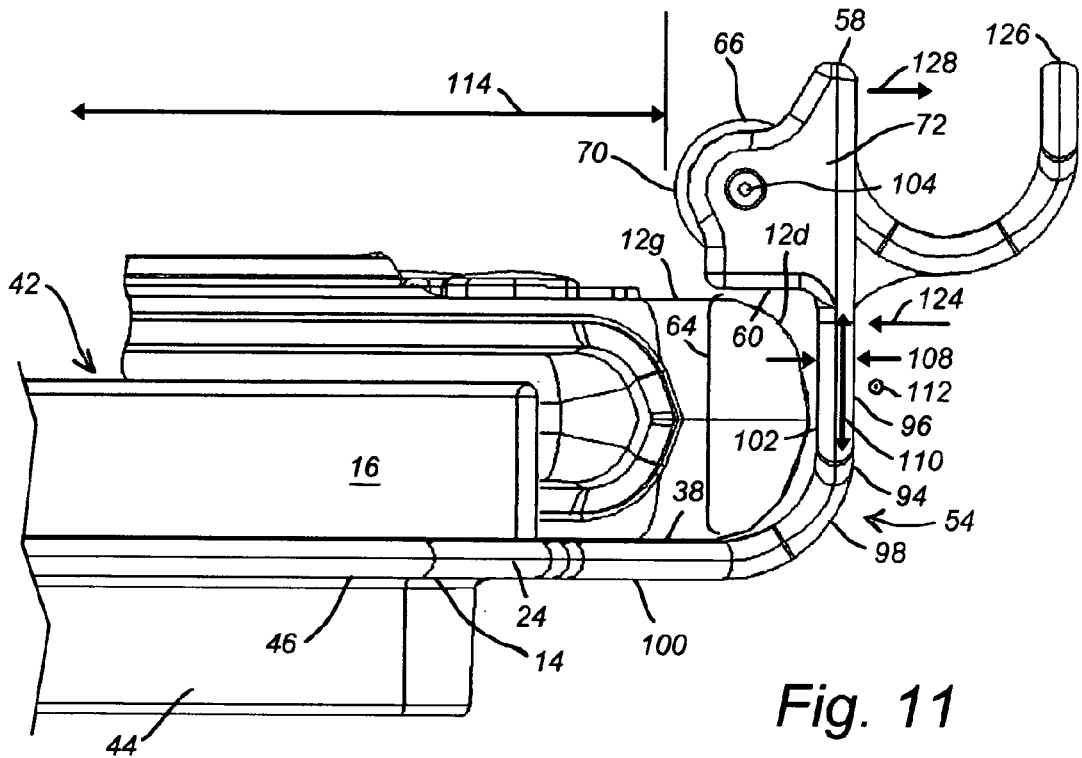
FIG. 11 illustrates a spring arm of the alternative novel device holder contracted from an expanded spacing for retaining the device therein.

FIG. 11 illustrates the spring arm 94 contracted from the shoulder-width expanded roller-to-receiver pocket spacing 116 needed to receive the device 12 to the initial relaxed roller-to-receiver pocket spacing 114. The spring arm 94 contracts automatically due to spring pressure, as indicated by arrow 124. The spring arm 94 operates by spring tension caused by bending deflection of the stem portion 96 away the spine 24 of the backing plane 14. Additional spring tension may be caused by the involvement of the root portion 98 in spreading the spring arm 94 as a matter of design choice without deviating from the scope and intent of the present invention. The necked-down base portion 100 may also be incorporated for adding spring tension into the spreading the spring arm 94 as a matter of design choice also without deviating from the scope and intent of the present invention. Accordingly, once the device 12 is past the roller 66, the head portion 58 snaps back into its relaxed position with its interior surface 62 adjacent to the device head 12c and the inwardly facing retention tongue 60 adjacent to the face portion 12g of the device head portion 12c. The head portion 58 of the spring arm 94 thus reforms the retention notches 64 between the inwardly facing retention tongue 60 and the device resting surface 38 interior of the backing plane 14. Thereafter, the device head portion 12c is captured within the retention notch 64, and the device 12 is effectively retained in the interior volume 42 of the device holder 10.

The device 12 is released from the alternative device holder 10 in reverse of the insertion described herein by forcing the device head portion 12c away from the backing plane 14. Pressure of the head portion 12c against the roller 66 forces the head 58 to flex outwardly away from the backing plane 14, whereupon the head portion 12c is rolled through the resulting expanded roller-to-receiver pocket spacing 116.

Incorporation of the roller 66 with the head portion 58 in the spring arm 94 similarly operates to either retract the device 12 into the holder 10, or to eject it therefrom as a function the position of the axis 104 of the roller 66 relative to the maximum of the contour 12h of the head portion 12c of the device 12.

Optionally, the head 58 is formed with a handle 126 external of the interior volume 42 of the device holder 10. The handle 126 is operable by the user for exerting a force on the spring arm 94 outwardly away from the backing plane 14, as generally indicated by arrow 128. The outward force generally indicated by arrow 109 flexes the stem portion 94 of the spring arm 94 outward of the spine 24 of the backing plane 14, as generally indicated in FIG. 10 by arrow 118, to expanded roller-to-receiver pocket spacing 116 sufficiently wide for the shoulder portions 12d of the device 12 to pass the roller 66, as generally indicated by arrow 106, whereupon the head portion 12c is rolled through the resulting expanded inter-roller spacing 116.

Optionally, the axes 68 or 104 of the rollers 66 are oriented differently relative to the backing plane 14 as a function of the peculiar shape of the device 12 intended for use with the novel device holder 10.

Figure 12:
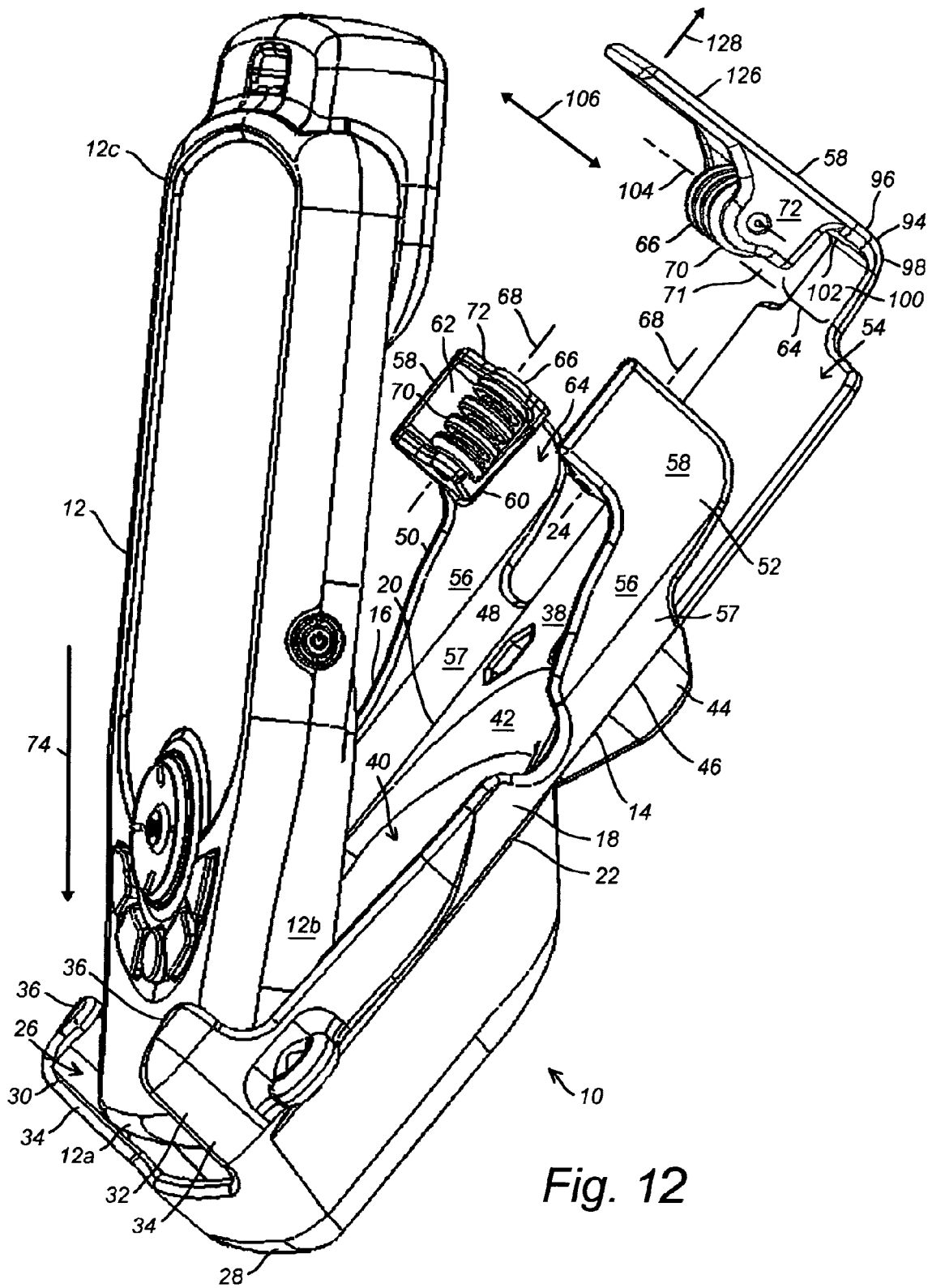
FIG. 12 illustrates another alternative embodiment of the novel quick release portable device holder.

FIG. 12 illustrates another alternative embodiment of the novel quick release portable device holder 10. Such alternative embodiments are also contemplated and may be substituted without deviating from the scope and intent of the present invention. Thus, as illustrated here by example and without limitation, this alternative device holder 10 is formed having the single resiliently expandable latching or "spring" arm 94 adjacent to the entrance end 54 and spaced apart from the receiver pocket 26 in combination with the pair of symmetrically opposing resiliently expandable spring arms 50, 52 spaced apart on opposite sides 20, 22 of the backing plane 14. Multiples of the spring arms 94 and 50, 52 are also contemplated and may be substituted as a matter of design choice without deviating from the scope and intent of the present invention.

Figure 13:
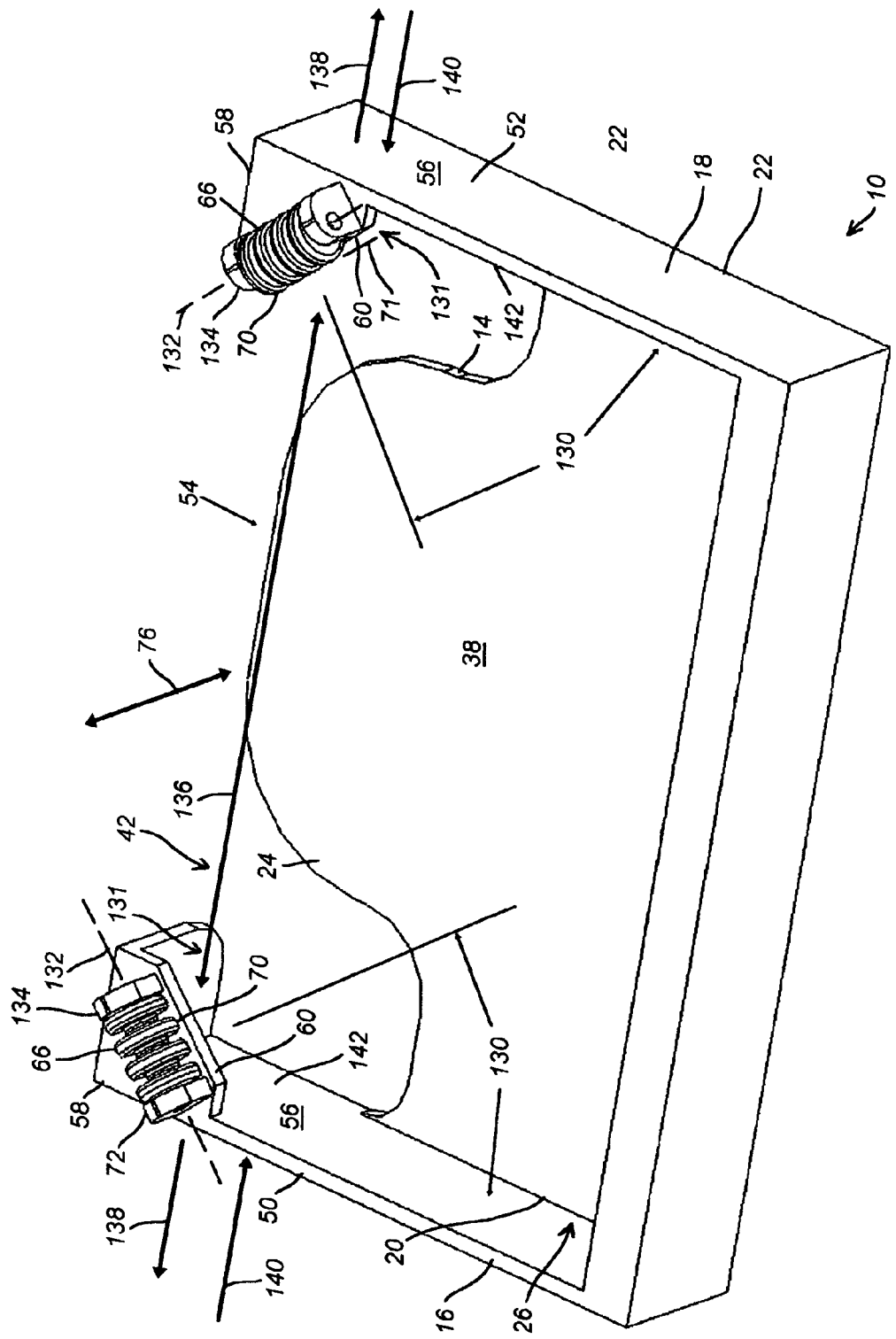
FIG. 13 illustrates still another alternative embodiment of the novel quick release portable device holder.

FIG. 13 illustrates still another alternative embodiment of the novel quick release portable device holder 10. As discussed herein, such alternative embodiments are also contemplated and may be substituted without deviating from the scope and intent of the present invention. Thus, as illustrated here by example and without limitation, this alternative device holder 10 is formed having the the pair of symmetrically opposing resiliently expandable spring arms 50, 52 spaced apart on opposite sides 20, 22 of the backing plane 14 adjacent to the entrance end 54 and spaced apart from the receiver pocket 26. As illustrated here in simplified form, each of the spaced apart spring arms 50, 52 is formed by example and without limitation as having the resiliently flexible stem portion 56 projected from the spine 24 of the backing plane 14 and extending along the respective side wall 16, 18 away from the receiver pocket 26. Each of the spring arms 50, 52 is illustrated as terminating in the head portion 58 which is spaced away from the spine 24 of the backing plane 14. Each head portion 58 is formed with the device retention tongue 60 extended from an interior surface 62 thereof Each retention tongue 60 extends inwardly of the backing plane 14. Here, each retention tongue 60 is oriented at an angle 130 relative to both the spine 24 of the backing plane 14 and the receiver pocket 26. Each retention tongue 60 thus extends generally toward both the receiver pocket 26 and the opposing one of the arms 50 (or 52). Each retention tongue 60 generally faces toward the device resting surface 38 interior of the backing plane 14 and is spaced away therefrom. An angled device retention notch 131 is formed between the retention tongue 60 of each spring arm 50, 52 and the interior device resting surface 38 of the backing plane 14 between the opposing side walls 16, 18 thereof. Thus, one of the angled retention notches 131 is formed on opposite sides of the device holder 10 adjacent to each of the opposing side walls 16, 18 between the retention tongue 60 of each spring arm 50, 52 and the interior device resting surface 38 of the backing plane 14. Furthermore, the angled retention notches 131 are angularly oriented relative to both the spine 24 of the backing plane 14 and the receiver pocket 26 so as to form corner "pockets" on opposite sides of the entrance end 54 of the device holder 10.

Additionally, each of the spring arms 50, 52 also includes the small roller 66 rotatably coupled to the angled head portion 58 with each of the rollers 66 being oriented such that it is rotatable about an axis 132 angled relative to the corresponding stem 56. The rollers 66 are each spaced farther from the backing plane 14 than the corresponding retention tongue 60. Furthermore, each of the rollers 66 is formed with the circumference 70 that is sufficiently large relative to the head portion 58 as to be extended inwardly of the backing plane 14 into the interior volume 42 of the device holder 10 farther than the corresponding retention tongue 60. Accordingly, the retention tongues 60 include the set-back 71 from the circumference 70 of the rollers 66 large enough for the retention tongue 60 to remain spaced away from contact with the device 12 during both insertion and subsequent removal. Furthermore, the axes 132 of the rollers 66 are further oriented substantially crosswise of the rotational direction of the head portion 12c of the device 12 during insertion and removal, that is substantially normal to the interior device resting surface 38 of the backing plane 14, as generally indicated by arrow 76.

Optionally, as illustrated here, the rollers 66 are suspended from the corresponding head portion 58 on a pair of support flanges 134. Each pair of support flanges 134 is structured to rotatably couple the corresponding roller 66 therebetween. The circumference 70 of each roller 66 is sufficiently large relative to the support flanges 134 as to be extended inwardly of the backing plane 14 into the interior volume 42 of the device holder 10 farther than the corresponding support flanges 134.

As illustrated, the head 58 is optionally formed with the retention tongue 60 integral with the flanges 134 supporting the rollers 66.

As discussed herein, the device 12 inserted into the novel quick release portable device holder 10 when the base portion 12a of the device 12 is received into the receiver pocket 26.

The spring arms 50, 52 are resiliently spreadable to increase an initial relaxed inter-roller spacing 136 between the rollers 66 to an intermediate expanded inter-roller spacing spread outwardly of the backing plane 14, as generally indicated by arrows 138, sufficiently wide to pass therebetween the opposing shoulder portions 12d of the device 12. As generally indicated by arrows 138, the stem portions 56 of the spring-arms 50, 52 simultaneously flex outward of the spine 24 of the backing plane 14 to expanded inter-roller spacing 136 sufficiently wide for the shoulder portions 12d of the device 12 to pass between the opposing rollers 66, as generally indicated by arrow 76.

During the insertion (and removal) process, only the rollers 66 contact the device shoulders 12d adjacent to corners thereof. As indicated by arrows 140, spring pressure of the expanded spring arms 50, 52 causes the rollers 66 to substantially continuously follow contours 12e of device shoulders 12d. The circumference 70 of the rollers 66 is sufficiently large relative to other components the head portion 58 generally and the device retention tongues 60 particularly such that contact with the device shoulders 12d is effectively restricted to only the rollers 66 during both the insertion and removal processes. The rollers 66 remain in contact with the device shoulders 12d until the back portion 12f of the device 12 is substantially seated against the device resting surface 38 interior of the backing plane 14 with the base portion 12a of the device 12 is seated in the receiver pocket 26. Thus, the rollers 66 protect the soft and impressionable elastomer materials of the device shoulders 12d from any contact with the unforgiving rigid material of the head portion 58 generally and the device retention tongues 60 particularly so that scratching and other potential damage to the device 12 is avoided. Rolling motion of the rollers 66 over the device shoulders 12d even ensures that even the surface finish of the soft and impressionable elastomer materials of the device 12 is protected even from scuffing. Accordingly, the rollers 66 are optionally either a soft rubbery material, such as neoprene, or a harder material, such as injection molded plastic. Either the soft rubbery material or the harder material can be used without damaging even the surface finish of the soft and impressionable elastomer materials of the device 12.

The spring arms 50, 52 contract automatically due to spring pressure, as generally indicated by arrows 140. Accordingly, once the device 12 is out from between the rollers 66, the head portions 58 snap back into their respective relaxed positions with respective interior surfaces 142 adjacent to the device shoulders 12d and the inwardly facing retention tongues 60 adjacent to a face portion 12g of the device head portion 12c. The head portions 58 of the respective spring arms 50, 52 thus reform the angled retention notches 131 between the inwardly facing retention tongues 60 and the device resting surface 38 interior of the backing plane 14. Thereafter, the device shoulder portions 12d are captured within the angled retention notches 131, and the device 12 is effectively retained in the interior volume 42 of the device holder 10.

Thus, alternative configurations of the spring arms 94 and 50, 52 are also contemplated and may be substituted as a matter of design choice without deviating from the scope and intent of the present invention.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A portable device holder, comprising:
   a backing plane formed with a substantially rigid spine portion and comprising a receiver pocket adjacent to a first end thereof; and
   one or more resiliently flexible latching arms expandably extended from the backing plane spaced away from the receiver pocket, each of the one or more latching arms arranged in a nominally upright orientation relative to the backing plane and at least one roller suspended from at least one flange coupled thereto in a position spaced away from an interior of the receiver pocket, and a retention tongue between the roller and an interior surface of the backing plane, the retention tongue being positioned distal from the interior surface of the backing plane and immediately proximate to the flange suspending the roller and being set back from a circumference of the roller.

2. The device holder of claim 1 wherein the retention tongue is set back from an outer circumference of the one or more rollers, whereby the retention tongue is extended between the outer circumference of the one or more rollers and an inner surface of the latching arm.

3. The device of claim 2 wherein the one or more rollers further comprises a rotational axis thereof substantially crosswise to a direction substantially normal to the interior surface of the backing plane.

4. The device holder of claim 1 wherein the one or more latching arms further comprises a pair of the latching arms, each of the pair of latching arms extending from the backing plane adjacent to opposite sides thereof.

5. The device holder of claim 4 wherein the resiliently flexible stem portion of each of the pair of the latching arms further comprises a torsional spring.

6. The device holder of claim 3 wherein the rotational axis is further oriented substantially parallel with the spine portion of the backing plane.

7. The device holder of claim 3 wherein the one or more latching arms further comprises one or more of the latching arms extending from the spine portion of the backing plane adjacent to an end thereof opposite from the receiver pocket.

8. The device holder of claim 1, further comprising a retention notch formed between the backing plane and the retention tongue for receiving thereinto a portion of a portable device.

9. The device holder of claim 3 wherein the one or more latching arms further comprises a pair of the latching arms, each of the pair of latching arms extending from the backing plane adjacent to opposite sides thereof in combination with one or more of the latching arms extending from the spine portion of the backing plane adjacent to an end thereof opposite from the receiver pocket.

10. A portable device holder, comprising:
a backing plane formed with a substantially rigid spine portion having a pair of side walls extended on opposite sides thereof and comprising a receiver pocket adjacent to a first end thereof; and
a springingly resilient flexible latching arm extending expandably directly from the backing plane in a position spaced apart from the receiver pocket and further comprising:
a springingly resilient flexible stem portion arranged in a nominally upright orientation relative to the backing plane, and
a terminal head portion comprising one or more flanges suspending a roller spaced away from the backing plane opposite an interior interface surface thereof and rotatable about an axis substantially crosswise to a direction substantially normal to the interior surface and having a circumference extended past the one or more flanges, and a retention tongue between the roller and the interior interface surface of the backing plane being in a position distal from the interior surface of the backing plane and immediately proximate to the one or more flanges suspending the roller and being set back from a circumference of the roller.

11. The device holder of claim 10, wherein the retention tongue further forms a retention notch with the interior surface of the backing plane, the retention notch being sized for receiving thereinto a portion of a portable device between the retention tongue and the interior surface of the backing plane.

12. The device holder of claim 11, further comprising a plurality of latching arms, one or more of the plurality of latching arms extending from opposite sides the backing plane, and the terminal head portion of each of the plurality of latching arms extending from opposite sides the backing plane facing generally toward the terminal head portion of an opposing one of the latching arms.

13. The device holder of claim 12 wherein the springingly resilient flexible stem portion of each of the plurality of latching arms extending from opposite sides the backing plane further comprises a torsional spring.

14. The device holder of claim 10 wherein the latching arm is further extended from the spine portion of the backing plane opposite from the receiver pocket and in an opposite direction therefrom.

15. The device holder of claim 14 wherein the axis of the roller is further oriented substantially crosswise of the spine portion of the backing plane.

16. A portable device holder, comprising:
a substantially rigid backing plane comprising a substantially rigid spine portion formed with opposing side walls formed adjacent to opposing sides of a substantially smooth interior interface surface thereof;
a substantially rigid receiver pocket formed adjacent to a base portion of the backing plane;
a pair of spaced apart substantially symmetrically opposing resiliently flexible spring latching arms, each of the spring latching arms comprising a resiliently flexible stem portion extending directly from one of the opposing side walls of the backing plane adjacent to the receiver pocket and substantially terminating in head portion spaced apart from the receiver pocket and spaced away from the interior interface surface of the backing plane, each head portion comprising:
a flange extended generally toward the head portion of the opposing arm spaced apart therefrom,
one or more rollers each rotatably coupled to the flange and being rotatable about an axis substantially aligned substantially parallel to the stem portion, and
a retention tongue formed on a surface of the flange facing substantially toward the interior interface surface of the backing plane and spaced away therefrom in a position between the roller and the interior interface surface of the backing plane, the retention tongue being positioned distal from the interior interface surface of the backing plane and immediately proximate to the flange suspending the roller and extending less than a circumference of the roller from an interior surface of the latching arm toward the interior of the receiver pocket and over a portion of the interior surface of the backing plane; and
a retention notch formed between the retention tongue and the interior interface surface of the backing plane and sized for receiving thereinto a portion of a portable device.

17. The device holder of claim 16 wherein the one or more rollers are further formed of a substantially rigid material.

18. The device holder of claim 16 wherein each head portion further comprises a pair of spaced apart flanges extended generally toward the head portion of the opposing arm spaced apart therefrom and having one of the rollers rotatably suspended therebetween.

19. The device holder of claim 16 wherein each of the spring latching arms further comprises a torsion spring comprising a curved root portion coupled between the stem portion a respective one of the opposing side walls of the backing plane.

20. The device holder of claim 16, further comprising a mounting interface structure formed on an outside backing surface of the backing plane opposite from the interior interface surface thereof.

21. The device holder of claim 16 wherein the receiver pocket further comprises a pair of spaced apart receiver arms extending from the opposing side walls of the backing plane.

22. A method for holding a portable device, the method comprising:

at least partially inserting a base portion of a portable device into a receiver pocket formed adjacent to a base portion of a backing plane;

moving an upper portion of the device opposite from the base portion thereof toward a spine portion of the backing plane adjacent to the receiver pocket;

flexing a flange suspending one or more rollers outwardly of a spine portion of the backing plane;

flexing outwardly of a spine portion of the backing plane and the receiver pocket one or more retention tongues spaced away from the receiver pocket in a position between the roller and an interior surface of the spine portion of the backing plane and positioned distal from the interior surface of the spine portion of the backing plane and immediately proximate to the flange suspending the roller and being set back from a circumference of the roller;

seating the device substantially against the spine portion of the backing plane;

partially relaxing the flange suspending the one or more rollers inwardly of the spine portion of the backing plane against the device and being partially flexed outwardly of the spine portion of the backing plane less than the flexing thereof outwardly of the backing plane;

the partially relaxing the flange suspending the one or more rollers inwardly of the spine portion of the backing plane forming at least one retention notch in a position between the retention tongue and the spine portion of the backing plane sized to receive a portion of the device thereinto; and receiving into at least one retention notch a portion of the device by flexing at least one of the one or more retention tongues inwardly of a spine portion of the backing plane with the portion of the device at least partially retained between the retention tongue and the backing plane.

23. The method of claim 22 wherein the seating the device substantially against the spine portion of the backing plane further comprises rolling the device past the one or more retention tongues on a circumferential portion of one of the one or more rollers.

24. The method of claim 23 wherein the forming at least one retention notch around a portion of the device by flexing at least one of the one or more retention tongues inwardly of a spine portion of the backing plane further comprises positioning the at least one of the one or more retention tongues spaced between the roller and a portion of the spine portion of the backing plane having the device substantially seated thereagainst.

25. The method of claim 23 wherein the flexing one or more rollers outwardly of a spine portion of the backing plane further comprises seating a portion of the device against the roller, and pressing the device thereagainst.

26. The method of claim 25 wherein the flexing one or more rollers outwardly of a spine portion of the backing plane further comprises torsionally flexing a resiliently flexible latching arm coupling one of the one or more rollers to the backing plane.

27. The method of claim 26 wherein the forming at least one retention notch around a portion of the device further comprises relaxing the resiliently flexible latching arm coupling one of the one or more rollers to the backing plane.

28. The method of claim 26 wherein the flexing one or more rollers outwardly of a spine portion of the backing plane further comprises the flexing one or more retention tongues outwardly of a spine portion of the backing plane.

29. The method of claim 28 wherein the flexing one or more rollers and one or more retention tongues outwardly of a spine portion of the backing plane further comprises flexing an opposing pair of rollers and an opposing pair of retention tongues outwardly of opposing side portions of the spine portion of the backing plane; and the forming at least one retention notch around a portion of the device further comprises forming an opposing pair of retention notches around opposing portions of the device.

30. The method of claim 28 wherein the forming at least one retention notch around a portion of the device further comprises spacing the one or more rollers farther than a corresponding one of the one or more retention tongues away from the spine portion of the backing plane.

* * * * *